April 19, 1932.   J. C. GIPE ET AL   1,854,545
MEANS FOR MOUNTING PLATE GLASS
Filed June 27, 1929   3 Sheets-Sheet 3

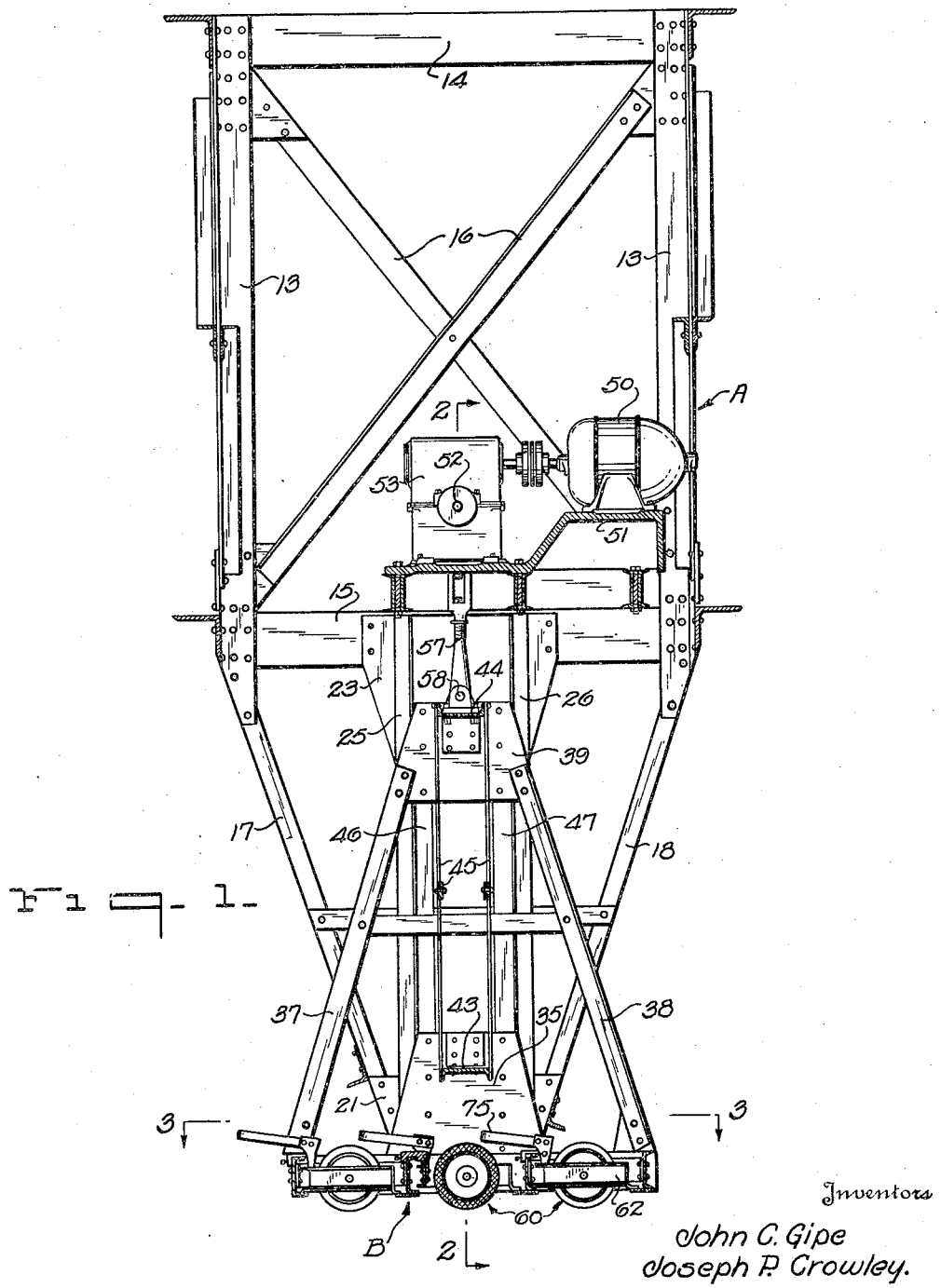

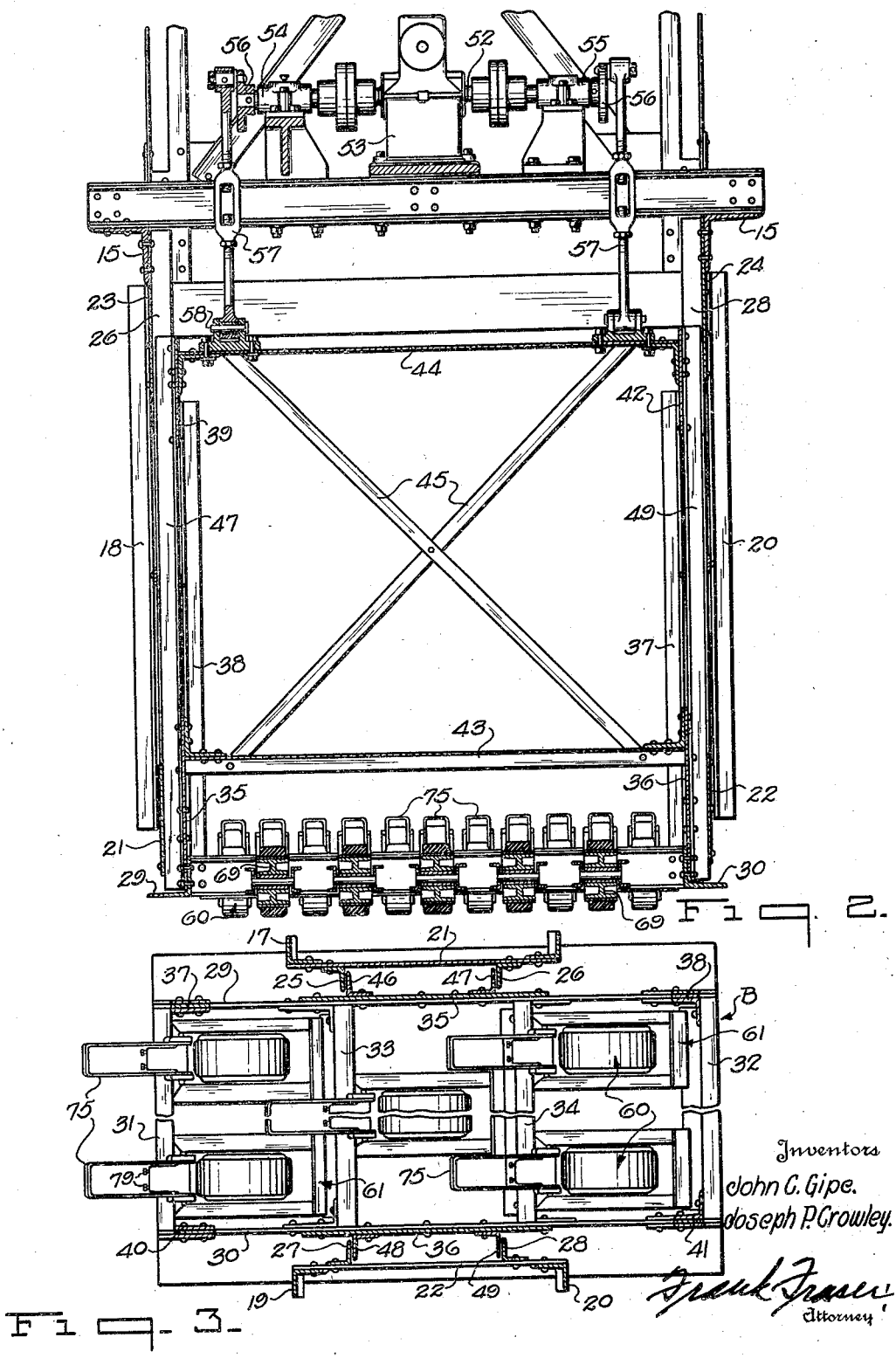

Inventors
John C. Gipe.
Joseph P. Crowley.
By Frank Fraser
Attorney

Patented Apr. 19, 1932

1,854,545

UNITED STATES PATENT OFFICE

JOHN C. GIPE AND JOSEPH P. CROWLEY, OF TOLEDO, OHIO, ASSIGNORS TO LIBBEY-OWENS-FORD GLASS COMPANY, OF TOLEDO, OHIO, A CORPORATION OF OHIO

MEANS FOR MOUNTING PLATE GLASS

Application filed June 27, 1929. Serial No. 374,019.

The present invention relates broadly to the surfacing of sheet glass or other flat sheets or plates and more particularly to improved means primarily adapted for use in what is commonly termed the continuous system for surfacing sheet glass.

It will be readily understood by those versed in the art that in the continuous system above referred to, a plurality of glass sheets to be surfaced are mounted upon a series of cars or tables which are arranged end to end and movable continuously in a definite substantially horizontal path to carry the glass sheets first beneath and in engagement with a series of grinding units, and then beneath and in engagement with a series of polishing units. In such system, it is ordinarily customary to secure the glass sheets to the tops of the cars or tables by embedding them within a relatively thin layer of plaster of Paris or some other suitable cement. The quality of the resultant finish on the glass and the amount of breakage during the grinding and polishing operations is largely dependent upon the proper securing of the glass sheets to the supporting tables.

This invention, therefore, has for its principal object the provision of improved means for embedding the glass sheets within the plaster of Paris or other cement used in such a manner that the sheets will be secured to the tables in an efficient and practical manner which will facilitate the succeeding treatment of the glass and reduce breakage from improper securing of the sheets to a minimum.

Another object of the invention is to provide means of the above character including a plurality of pressing elements movable over and in contact with the glass to force the same downwardly into the plastic material so as to effect the cementing of the glass sheets evenly and uniformly throughout their entire areas, means being provided for varying the pressure of the pressing elements upon the glass.

Another object of the invention is to provide means of the above character including a plurality of rotatable pressing elements pivotally carried by a common supporting frame and movable as a unit horizontally over the glass, means being carried by the supporting frame for limiting downward movement of the pressing element about their pivots upon raising of the frame relative to the glass.

Other objects and advantages of the invention will become more apparent during the course of the following description when taken in connection with the accompanying drawings.

Figure 4:
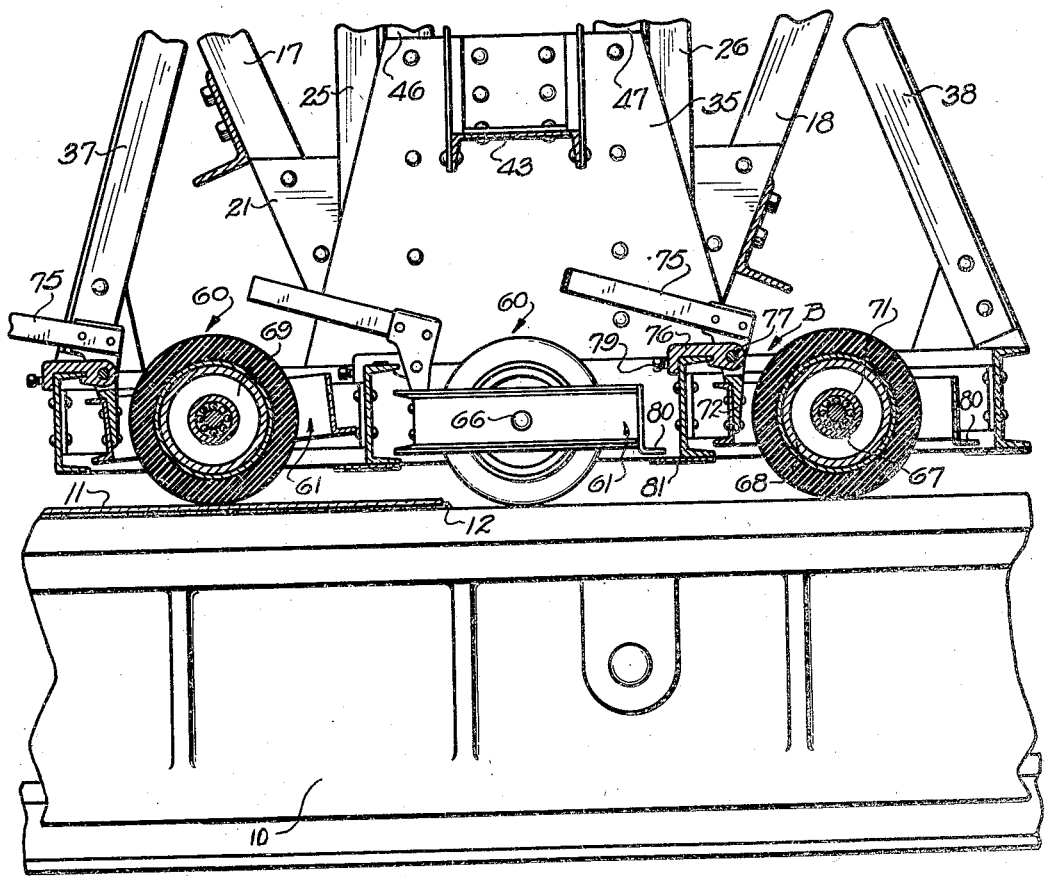
Figure 5:
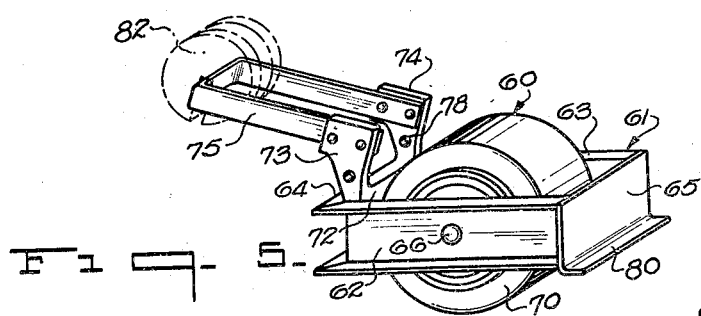

In the drawings wherein like numerals are employed to designate like parts throughout the same, Fig. 1 is a vertical sectional view of apparatus provided by the present invention, Fig. 2 is a vertical section taken substantially on line 2—2 of Fig. 1, Fig. 3 is a horizontal section taken substantially on line 3—3 of Fig. 1, Fig. 4 is an enlarged vertical section of the lower portion of the apparatus illustrated in association with a glass supporting table, and Fig. 5 is a perspective view of one of the pressing elements and its individual holder.

As previously pointed out, the present invention is primarily designed for use in the continuous system for surfacing sheet glass wherein a plurality of tables 10 (Fig. 4) are adapted to be arranged end to end in abutting relation to form a continuous train and to carry a series of glass sheets 11 mounted thereupon progressively first beneath a series of grinding units and then beneath a series of polishing units, not shown. The glass sheets 11 are ordinarily secured to the tops of the tables by embedding them within a layer of plaster of Paris or other suitable plastic material 12.

The present invention concerns particularly the provision of means in the form of a novel and improved apparatus or laying frame for pressing the glass sheets downwardly into the plastic material whereby to effect the accomplishment of those objects above set forth. The apparatus herein provided consists of a main supporting frame A, the upper portion of which is substantially rectangular and includes four vertical corner members 13 connected at their upper and lower ends by the horizontal transverse members 14 and 15 respectively and suitably braced by the diagonally extending bracing members 16. Carried by and depending from the two opposite vertical corner members 13 at one side of the frame A are the downwardly converging angle members 17 and 18, while secured to and depending from the corner members 13 at the opposite side of the frame are the downwardly converging angle members 19 and 20 which extend parallel with the angle members 17 and 18 respectively. Extending between and secured to the downwardly converging members 17 and 18 adjacent their lower ends is a plate 21, while extending between and secured to the lower ends of the opposite downwardly converging members 19 and 20 is a similar plate 22. Carried by the cross members 15 at opposite sides of the frame A and in substantial vertical alignment with the plates 21 and 22 are the plates 23 and 24. Extending between and secured to the inner faces of the lower and upper plates 21 and 23 respectively are the spaced vertical parallel guide members 25 and 26 and similar guide members 27 and 28 extend vertically between and are secured to the inner faces of the lower and upper plates 22 and 24 respectively at the opposite side of the frame.

Supported by and movable vertically with respect to the frame A is a horizontal carrier frame designated in its entirety by the letter B. The carrier frame B is substantially rectangular in top plan as best shown in Fig. 3, and comprises the longitudinally extending side members 29 and 30, the transverse end members 31 and 32 and the spaced intermediate cross members 33 and 34. The end members 31 and 32 and the cross members 33 and 34 are preferably in the form of channel beams as shown in Fig. 4. Secured to the opposite side members 29 and 30 of the carrier frame B intermediate the ends thereof are the vertically positioned plates 35 and 36 respectively.

Secured to the side member 29 of the carrier frame at opposite ends thereof are the two upwardly converging members 37 and 38 carrying at their upper ends a plate 39 in substantial vertical alignment with the lower plate 35. Secured to the opposite side member 30 of the carrier frame adjacent the opposite ends thereof are the two upwardly converging members 40 and 41 extending parallel with respect to members 37 and 38 respectively and carrying at their upper ends a plate 42 similar to plate 39 and in substantial vertical alignment with the lower plate 36. Extending between the opposite lower plates 35 and 36 is a horizontal bracing beam 43 while extending between the upper plates 39 and 42 is a similar horizontal bracing beam 44, said beams 43 and 44 being connected by the diagonally extending braces 45. Secured to the outer faces of the upper and lower plates 35 and 39 are the spaced vertical guide members 46 and 47 arranged inwardly of and adapted to cooperate with the guide members 25 and 26 carried by the supporting frame A, while extending between and secured to the outer faces of the upper and lower plates 36 and 42 are the vertical guide members 48 and 49 arranged inwardly of and adapted to cooperate with the vertical guide members 27 and 28 carried by supporting frame A.

For the purpose of raising and lowering the carrier frame B with respect to the supporting frame A, there is provided a motor 50 supported upon a platform 51 and adapted to drive the horizontal shaft 52 through the intermediary of suitable reduction gearing located in the housing 53. The shaft 52 extends through the housing 53 and is journaled adjacent its opposite ends in bearings 54 and 55. Secured to each end of the shaft 52 is an eccentric 56 to which is connected the upper end of a turn-buckle 57 pivoted at its lower end as at 58 to the horizontal bracing beam 44. Upon operation of motor 50 to drive the shaft 52, the operation of the eccentrics 56 will function to raise and lower the turn-buckles 57 and carrier frame B, said carrier frame being guided in its vertical movements by the cooperating guide members 25, 26, 46 and 47; and 27, 28, 48 and 49 above described.

The horizontal carrier frame B is adapted to pivotally support a plurality of rotatable pressing elements or rolls 60. These pressing rolls 60 are adapted to be independently supported, and there is therefore provided for each roll a separate holder 61 comprising, as shown in Fig. 5, the side portion 62 and 63 and the end portions 64 and 65. The pressing roll 60 is arranged within the holder 61 and is mounted upon a shaft 66 journaled in the opposite side portions 62 and 63 of said holder. Each of the pressing rolls 60 comprises a hub 67 and a rim 68 connected with the hub by means of an annular web 69 shown in Fig. 2. Mounted upon the rim 68 is a covering 70 preferably of hard rubber, rubber composition, or the like. Roller bearings 71 are also preferably interposed between the hub 67 and shaft 66.

Carried by the end portion 64 of holder 61 is a substantially U-shaped bracket 72 having the spaced upwardly projecting legs 73 and 74 connected by the substantially U-shaped strap 75. A plurality of holders 61 are arranged within the carrier frame B and are adapted to be pivotally secured to the end member 31 and the cross members 33 and 34. The holders 61 are so arranged that the pressing rolls 60 in adjacent transverse rows are in staggered relation with respect to one another as shown in Fig. 3. To secure each holder 61 in place, there is provided a supporting member 76, the forward end thereof being received between the spaced legs 73 and 74 of bracket 72 and mounted upon a shaft 77 passing through the openings 78 in said legs. The member 76 rests upon the end member 31 or cross member 33 or 34 and is clamped thereto by means of a bolt or the like 79. Thus, the holder 61 is adapted to pivot about the shaft 77. In order to limit the downward movement of the rolls 60 about their pivots upon raising of the carrier frame B, the forward end portion 65 of each holder 61 is provided with a forwardly directed flange 80 adapted to abut a plate 81 carried by the end member 31 or cross members 33 and 34. To vary the pressure of the pressing elements upon the glass, suitable weights 82 may be placed upon the outer end of strap 75 tending to rock the holder 61 about its pivot to raise the corresponding pressing roll. When a greater pressure is desired, the weights are removed.

In operation, a relatively thin layer of plastic material 12 is first spread over the table 10 and the glass sheet 11 is then laid thereupon. The supporting frame A which may be carried by a conventional crane or the like is then lowered until the pressing rolls 60 rest upon the glass, after which the frame is moved in a horizontal direction to carry the rolls as a unit over the glass, the weight of said rolls acting to press the glasss downwardly into the plastic material.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In apparatus for mounting glass sheets which are to be surfaced, a bed upon which the glass sheet is adapted to be mounted, a layer of plastic material on said bed and upon which the glass initially rests, a movable supporting frame, and a plurality of pressing elements pivotally carried by said frame for pressing the glass downwardly into the plastic material.

2. In apparatus for mounting glass sheets which are to be surfaced, a bed upon which the glass sheet is adapted to be mounted, a layer of plastic material on said bed and upon which the glass initially rests, a plurality of rotatable pressing elements for pressing the glass downwardly into the plastic material, a movable supporting frame, and means for pivotally mounting the pressing elements upon said frame.

3. In apparatus for mounting glass sheets which are to be surfaced, a bed upon which the glass sheet is adapted to be mounted, a layer of plastic material on said bed and upon which the glass initially rests, a movable supporting frame, a plurality of pressing elements carried by said frame for pressing the glass downwardly into the plastic material, and means for varying the pressure of said elements upon the glass.

4. In apparatus for mounting glass sheets which are to be surfaced, a bed upon which the glass sheet is adapted to be mounted, a layer of plastic material on said bed and upon which the glass initially rests, a plurality of pressing elements for pressing the glass downwardly into the plastic material, a movable supporting frame, means for pivotally mounting the pressing elements upon said frame, and means for varying the pressure of said elements upon the glass.

5. In apparatus for mounting glass sheets which are to be surfaced, a bed upon which the glass sheet is adapted to be mounted, a layer of plastic material on said bed and upon which the glass initially rests, a plurality of rotatable pressing elements for pressing the glass downwardly into the plastic material, a movable supporting frame, and separate means for pivotally supporting said elements upon said frame.

6. In apparatus for mounting glass sheets which are to be surfaced, a bed upon which the glass sheet is adapted to be mounted, a layer of plastic material on said bed and upon which the glass initially rests, a plurality of rotatable pressing elements for pressing the glass downwardly into the plastic material, a movable supporting frame, separate means for pivotally supporting said elements upon said frame, and means for independently varying the pressure of the pressing elements upon the glass.

7. In apparatus for mounting glass sheets which are to be surfaced, a bed upon which the glass sheet is adapted to be mounted, a layer of plastic material on said bed and upon which the glass initially rests, a movable supporting frame, a plurality of pivotally mounted pressing elements carried by said frame for pressing the glass downwardly into the plastic material, and means for limiting the downward movement of each pressing element about its pivot.

8. In apparatus for mounting glass sheets which are to be surfaced, a bed upon which the glass sheet is adapted to be mounted, a layer of plastic material on said bed and upon which the glass initially rests, a movable supporting frame, a plurality of pivotally mounted pressing elements carried by said frame for pressing the glass downwardly into the plastic material, means for varying the pressure of said elements upon the glass, and means for limiting the downward movement of said pressing elements about their pivots.

9. In apparatus for mounting glass sheets which are to be surfaced, a bed upon which the glass sheet is adapted to be mounted, a layer of plastic material on said bed and upon which the glass initially rests, a plurality of rotatable pressing elements for pressing the glass downwardly into the plastic material, a separate holder for each element, a horizontal carrier frame, and means for pivotally securing said holders to said frame.

10. In apparatus for mounting glass sheets which are to be surfaced, a bed upon which the glass sheet is adapted to be mounted, a layer of plastic material on said bed and upon which the glass initially rests, a plurality of rotatable pressing elements for pressing the glass downwardly into the plastic material, a separate holder for each element, a horizontal carrier frame, means for pivotally securing said holders to said frame, and means carried by the holders for varying the pressure of the pressing elements upon the glass.

11. In apparatus for mounting glass sheets which are to be surfaced, a bed upon which the glass sheet is adapted to be mounted, a layer of plastic material on said bed and upon which the glass initially rests, a plurality of rotatable pressing elements for pressing the glass downwardly into the plastic material, a separate holder for each element, a horizontal carrier frame, means for pivotally securing said holders to said frame, and means carried by the carrier frame and engageable by said holders for limiting downward movement of the holders about their pivots.

12. In apparatus for mounting glass sheets which are to be surfaced, a bed upon which the glass sheet is adapted to be mounted, a layer of plastic material on said bed and upon which the glass initially rests, a plurality of rotatable pressing elements for pressing the glass downwardly into the plastic material, a separate holder for each element, a horizontal carrier frame, means for pivotally securing said holders to said frame, means carried by the holders for varying the pressure of the pressing elements upon the glass, and means carried by the carrier frame and engageable by said holders for limiting downward movement of the holders about their pivots.

13. In apparatus for mounting glass sheets which are to be surfaced, a traveling table constituting a bed upon which the glass sheet is adapted to be mounted, a layer of plastic material on said bed and upon which the glass initially rests, a movable main supporting frame, a carrier frame supported thereby and movable vertically relative thereto, and pressing means carried by the carrier frame for pressing the glass downwardly into the plastic material.

14. In apparatus for mounting glass sheets which are to be surfaced, a traveling table constituting a bed upon which the glass sheet is adapted to be mounted, a layer of plastic material on said bed and upon which the glass initially rests, a movable main supporting frame, a carrier frame supported thereby, cooperating guide members carried by said frames, means for moving the carrier frame vertically with respect to the main frame, and pressing means carried by the carrier frame for pressing the glass downwardly into the plastic material.

15. In apparatus for mounting glass sheets which are to be surfaced, a series of separable tables adapted to be coupled in end to end relation and moved horizontally under a series of surfacing elements, said tables constituting a bed upon which the glass sheets are adapted to be mounted, a layer of plastic material on said bed and upon which the glass initially rests, a main supporting frame, a horizontal carrier frame supported thereby, means carried by the main frame and having operative connections with the carrier frame for moving the former vertically with respect to the latter, and a plurality of rotatable pressing elements carried by said carrier frame for pressing the glass downwardly into the plastic material.

16. In apparatus for mounting glass sheets which are to be surfaced, a series of separable tables adapted to be coupled in end to end relation and moved horizontally under a series of surfacing elements, said tables constituting a bed upon which the glass sheets are adapted to be mounted, a layer of plastic material on said bed and upon which the glass initially rests, a main supporting frame, a horizontal carrier frame supported thereby, cooperating vertical guide members carried by said frames, means carried by the main frame and having operative connections with the carrier frame for raising and lowering the latter vertically with respect to the former, and a plurality of rotatable pressing elements carried by said carrier frame for pressing the glass downwardly into the plastic material.

Signed at Toledo, in the county of Lucas, and State of Ohio, this 21st day of June, 1929.

JOHN C. GIPE.
JOSEPH P. CROWLEY.